United States Patent [19]
Sato

[11] Patent Number: 5,273,238
[45] Date of Patent: Dec. 28, 1993

[54] TWIN-HULL SEAPLANE

[76] Inventor: Susumu Sato, 5-15-6, Shonai Nishimachi, Toyonaka-shi, Osaka, Japan

[21] Appl. No.: 987,843

[22] Filed: Dec. 9, 1992

[30] Foreign Application Priority Data

Dec. 10, 1991 [JP] Japan .................. 3-361333

[51] Int. Cl.⁵ .......................................... B64C 35/00
[52] U.S. Cl. ................................... 244/105; 114/61;
114/272; 114/273; 244/45 R; 244/2
[58] Field of Search ............... 244/106, 105, 2, 45 R,
244/12.1; 114/61, 272, 273

[56] References Cited

U.S. PATENT DOCUMENTS

| | | | |
|---|---|---|---|
| 1,857,347 | 5/1932 | Beebe | 114/272 |
| 2,041,623 | 5/1936 | Uppercu | 244/106 |
| 2,354,453 | 7/1944 | Gazda | 114/272 |
| 2,464,957 | 3/1949 | Wood | 114/61 |
| 3,136,505 | 6/1964 | Fleury | 244/106 |
| 3,139,059 | 6/1964 | Hanford, Jr. | 114/273 |
| 3,244,246 | 4/1966 | Weiland | 244/12.1 |
| 3,918,382 | 11/1975 | Austin | 114/273 |
| 4,002,132 | 1/1977 | Nitzki | 114/61 |

Primary Examiner—Galen L. Barefoot
Attorney, Agent, or Firm—Nikaido, Marmelstein, Murray & Oram

[57] ABSTRACT

A twin-hull seaplane comprising two hulls spaced apart by a suitable distance, a cabin provided on the hulls integrally therewith, a front wing and a rear wing provided on the cabin and having a length not greater than the width of assembly of the two hulls or foldable to a length not greater than the width, aero-propulsion engined mounted on the front wing or the cabin, and a rudder attached to the rear wing. Each of the hulls is provided with hydro-propulsion means at a rear portion thereof.

1 Claim, 2 Drawing Sheets

TWIN-HULL SEAPLANE

BACKGROUND OF THE INVENTION

The present invention relates to twin-full seaplanes which can be moored directly to wharves, piers or the like for ships.

To energize districts accesible by no high-speed traffic means, it is desired to open air routes, whereas construction of airports on land for this purpose not only requires immense costs but also gives rise to the problem of environmental destruction of the district. This probelm can be obviated most suitably by opening an air route for seaplanes. When a seaplane air route is provided, for example, between cities along a coastline, between a coastal city and an island or between islands, it becomes unnecessary to build an airport in such cities or islands.

Although seaplane air routes are already available to fulfill the above-mentioned purpose, existing seaplanes have long wings projecting from the respective sides of a hull, are therefore moored off-shore in the sea away from a city or island, and take on or land passengers or cargo with use of ferryboats.

The present invention provides a twin-hull seaplane which can be moored alongside quays or piers for usual ships, so that an air route can be easily opened between any cities along a coastline, between a coastal city and an island, or between islands. The invention therefore serves for prevalent use of seaplanes, development of the industry concerned and prevention of environmental destruction.

SUMMARY OF THE INVENTION

The present invention provides a twin-hull seaplane which comprises two hulls spaced apart by a suitable distance, a cabin integrally provided on the hulls, a plurality of wings provided on the cabin respectively at a front portion and a rear portion thereof and having a length not greater than the width of assembly of the two hulls or foldable to a length not greater than the width, aero-propulsion engines mounted on the front wing or the cabin, and a rudder attached to the rear wing.

According to another aspect of the invention, each of the two hulls is provided with hydro-propulsion means at a rear portion thereof.

According to another aspect of the invention, at least one flap is provided on a bottom portion of the cabin between the two hulls.

According to another aspect of the invention, each of the hulls has a straight outer plate at a forward portion thereof on the lateral side of the seaplane.

When the twin-hull seaplane thus constructed is to be navigated in the sea, the wing projecting from the hulls is folded upward. The seaplane can then be navigated by driving the hydro-propulsion means and moored to usual wharves, quays or piers like usual ships. For a flight, the seaplane is navigated to a specified region of the sea, the wing is then unfolded and the aero-propulsion engines are driven, whereby the seaplane is caused to plane on the sea, rise from the water and fly. To ensure safe flights, it is desirable for the plane to fly at low altitudes above the sea. The plane can then readily alight on the water in the event of the aero-propulsion engine developing a trouble, and can be navigated in the sea to the destination by the operation of the hydro-propulsion means.

The twin-hull seaplane has the following features unlike seaplanes which are generally known.

First, the cabin is provided integrally with the hulls and accordingly has a large capacity although compact.

Second, the cabin is positioned at a level out of contact with the water, so that the seaplane alights on the water with a reduced impact on the cabin.

Third, since the combination of two hulls is an independent floating body, the hulls can be divided into a multiplicity of independent compartments to provide an unsinkable structure.

Fourth, the seaplane has good stability during navigation in the sea even if the aero-propulsion engines, which are heavy, are mounted on the cabin at a high level.

Fifth, the aero-propulsion engines are mounted on the cabin at a high level and therefore will not be exposed to waves during planing on the water. This permits use of jet engines.

Sixth, the seaplane has the functions of preventing formation of bow waves outside the hulls during planing for a takeoff, positively causing an air stream to flow into the space between the hulls and permitting lift to act on the overall cabin. These functions obviate the influence of bow waves on other ships, shorten the planing distance for a takeoff and permit alighting on the water at a low speed to reduce the impact involved.

These and other features of the invention will become more apparent from the following description.

BRIEF DESCRIPTION OF THE DRAWINGS

The drawings schematically show a twin-hull seaplane embodying the present invention.

DESCRIPTION OF THE PREFERRED EMBODIMENT

Figure 1:
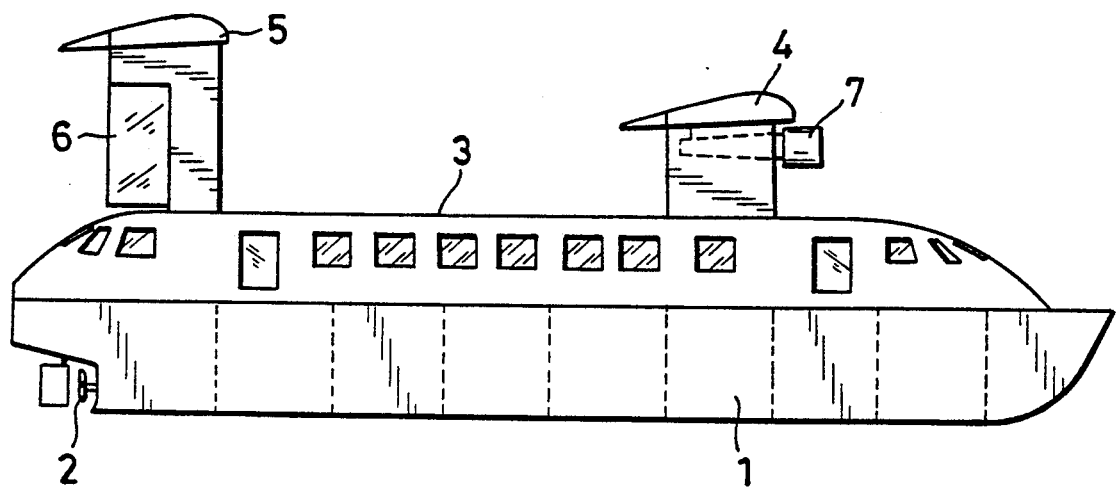
FIG. 1 is a side elevation of the twin-hull seaplane.
Figure 2:
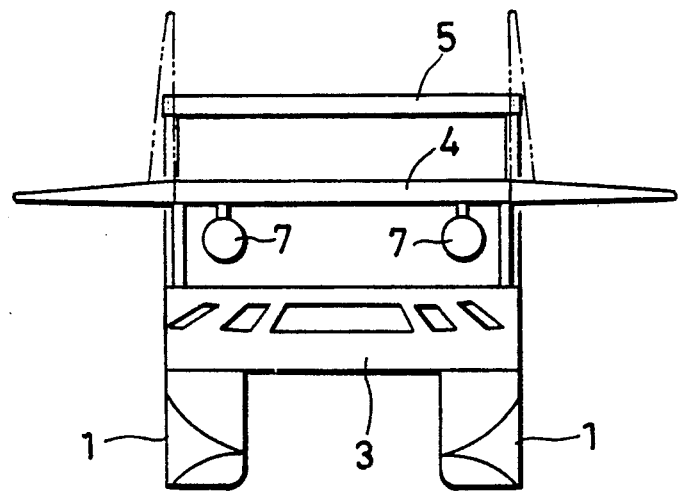
FIG. 2 is a front view of the seaplane.
Figure 3:
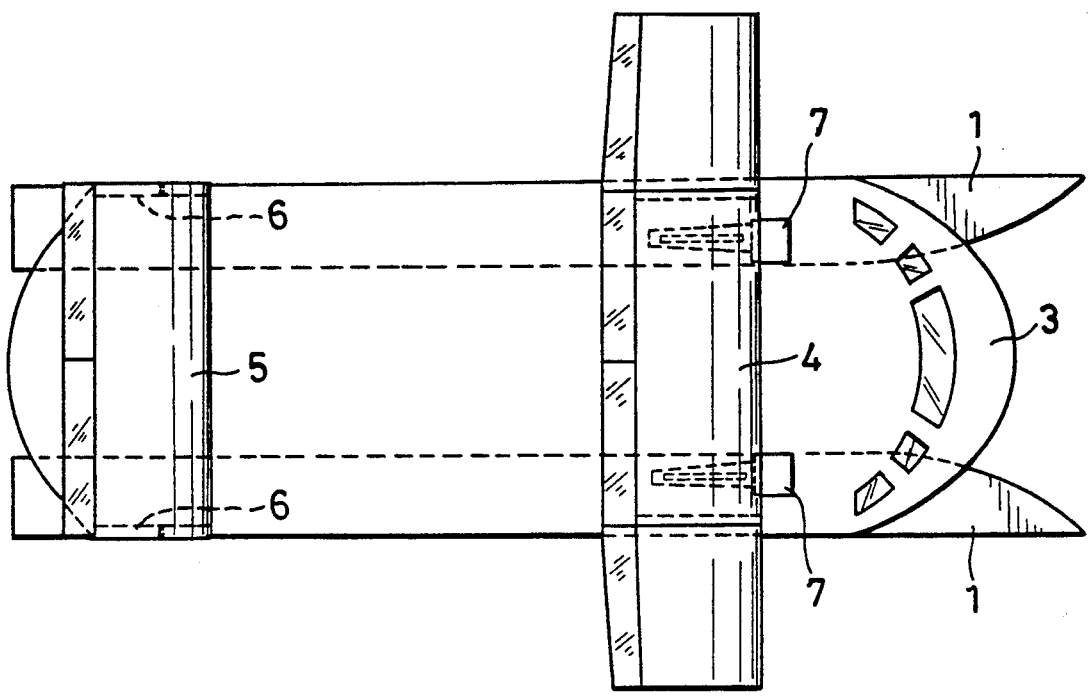
FIG. 3 is a plan view of the seaplane.

With reference to FIGS. 1 and 2 showing a twin-hull seaplane, the seaplane has two hulls 1 arranged as spaced apart by a suitable distance and each partitioned into a multiplicity of compartments arranged longitudinally of the seaplane. The combination of the hulls 1 serves as an independent floating body for supporting the entire weight of the seaplane in the sea. As shown in FIG. 3, each hull 1 has a straight outer plate at the bow or forward portion thereof on each lateral side of the seaplane to introduce a stream of water into the space between the hulls. With the present seaplane, the shape of the forward portion described is not limitative but can be the usual shape of bows. However, the shape shown in FIG. 3 is favorable because the illustrated shape serves, for example, to eliminate the influence of bow waves on other ships when the seaplane takes off or alights on the water and to positively introduce a stream of air into the space between the hulls 1 during flying. The rearmost compartment of each hull 1 is provided with hydro-propulsion means 2. This propulsion means 2 is a propeller rotatable by a lightweight high-speed engine as illustrated, or a hydrojet engine. The propulsion means is installed by the conventional method. The forward portion of the hull 1 is of course shaped to exhibit sea kindliness and internally has a pressure-resistant structure. A cabin 3 is provided integrally with the hulls 1 over the entire width of the combination of hulls, and has a forward portion and rear portion which are of course streamlined. The cabin 3 is internally partitioned into a cockpit in the front and other compartments for use as passenger compartments and cargo compartments, and has front and rear gangways in its opposite sides. As seen in FIGS. 1 to 3, a front wing 4 and a rear wing 5 are provided on the cabin 3, each as supported by a post at a required level. The front wing 4 has opposite ends projecting outward beyond the cabin 3 over a large length to provide a required wing area. The projections are upwardly foldable for stowing as indicated in broken lines in FIG. 2. A hinge (so-called torque hinge) which is hydraulically operable is used for the fold. The rear wing 5 is supported by the post at a higher level than the front wing 4, with a rudder 6 attached to a portion of the post. The rear wing 5 has a length not greater than the width of the cabin 3 and coacts with the front wing 4 to maintain lift. Although the rudder 6 can be disposed at a location other than the post for the rear wing 5, for example, on the rear wing 5, the rudder 6 is preferably positioned closer to the center of gravity and is therefore provided on a portion of the post. Two aero-propulsion engines 7 are attached to the underside of the front wing 7 and are each a jet engine having a required thrust. With conventional seaplanes, the aero-propulsion engine attached to the wing is a rotary propeller engine since the wing is positioned at a low level, whereas with the present twin-hull seaplane, jet engines are usable since the engines are installed at a high level above the cabin 3. Further even if the jet engines, which are heavy, are positioned at a high level, no adverse influence is exerted on the seaplane during navigation in the sea because the plane has a twin-hull structure. Although rotary propeller engines are usable, it will then become necessary to position the front wing 4 at a higher level.

Figure 4:
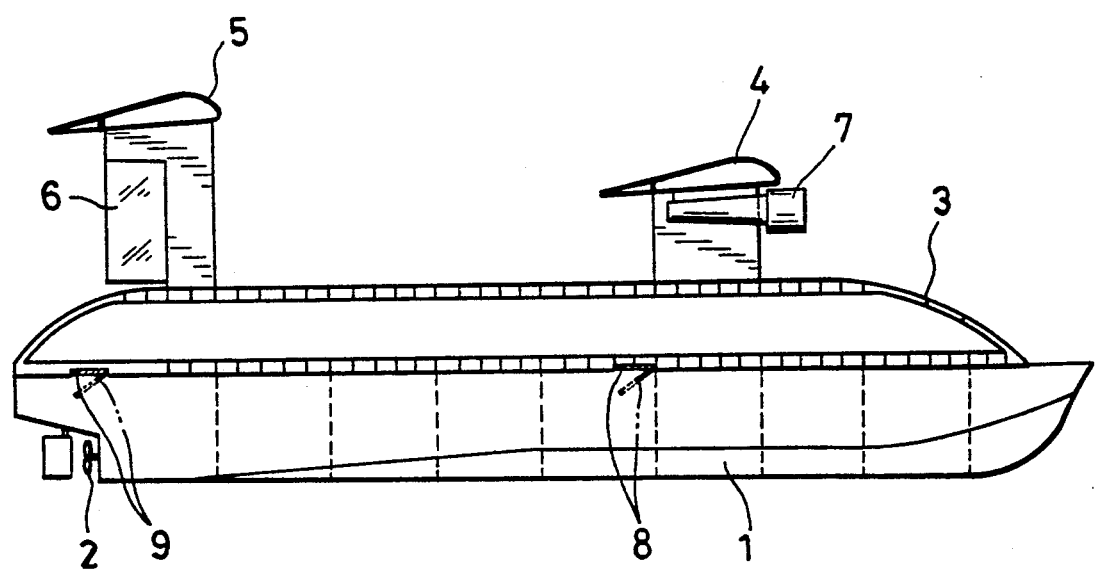
FIG. 4 is a side elevation in longitudinal section of the seaplane.

As will be apparent from FIG. 4, the cabin 3 is provided with a front flap 8 and/or a rear flap 9 on its underside between the two hulls 1. These flaps 8 and 9 serve as auxiliary means for retaining the air steam introduced into the space between the hulls 1 to maintain the lift. The present twin-hull seaplane is held in a position with an angle of elevation when taking off or alighting on the water, whereby lift is produced also in the cabin 3 itself to coact with the lift due to the wings. The flaps 8, 9 have the function of adding to the lift. This serves to minimize the wing area needed, shortens the planing distance for a takeoff and permits the seaplane to alight on the water at the lowest possible speed to reduce the impact to be produced on alighting.

Because of the foregoing construction and functions, the seaplane of the present invention can be navigated in harbors by the hydro-propulsion means like common ships when the front wing is folded, and can be moored to wharves, quays or piers for usual ships. Although not shown, the hull 1 is provided at its forward and rear portions with retractable bits serving as mooring means, and the plane is moored with ropes from the quay or pier. An accommodation ladder provided on the quay or pier is used for taking on or landing passengers. When the wind is unfolded and the aero-propulsion engines are driven in a specified region of the sea outside the harbor, the seaplane can be caused to plane and rise from the water for a flight like usual seaplanes.

Thus, the present twin-full seaplane is adapted to take off or alight in any port and is sevicable for any air route which is opened as desired. Incidentally, it is desirable for the seaplane to fly at low altitudes above the sea to avoid interference with flight areas for other airplanes.

We claim:

1. A twin-hull seaplane comprising two hulls spaced apart by a suitable distance, a cabin having substantially the same width as the hulls and said cabin provided on the hulls integrally therewith, a plurality of wings supported on the cabin by posts respectively at a front portion and a rear portion thereof, the front wing having a length greater than said width of said cabin and portions which are foldable and attached to a center portion having a length not greater than said width, jet engines mounted on the front wing, and a rudder attached to the rear wing.

* * * * *